United States Patent Office 3,029,940
Patented Apr. 17, 1962

3,029,940
PACKAGING MATERIAL AND METHOD FOR MAKING SAME
Stig Lagergren, Evanston, Ill., assignor to United States Gypsum Company, Chicago, Ill., a corporation of Illinois
No Drawing. Filed June 13, 1960, Ser. No. 35,422
9 Claims. (Cl. 206—84)

This invention relates to an improved paper composition for the packaging of materials such as hydrated lime and the like that are sensitive to absorption of carbon dioxide. More particularly, this invention relates to a paper coated with an organic material selected from the class of compounds known as polyvinyl alcohols.

The new and improved paper packaging material described herein has very unique, advantageous and totally unexpected characteristics which are achieved without impairing the working quality of the material and without impairing the filling characteristics of the bags or packages made therefrom.

Hydrated lime is an example of a chemical product that rapidly absorbs carbon dioxide from the atmosphere. When carbon dioxide combines with hydrated lime, the lime tends to form agglomerates or lumps in what was originally a colloidally fine powder. These agglomerates and lumps which appear usually in the form of a peripheral crust in the bagged lime are exceedingly difficult to disperse, and when the hydrated lime is used to make a lime putty, as is employed in building construction, the undispersed lumps do not readily wet through by soaking or mixing with water. When a putty made from lime with lumps therein is mixed with gypsum gauging plaster, as for use in the finish coat in plastering, the undispersed lumps do not properly blend with the gauging plaster, and they show up as streaks or spots. These streaks or spots exhibit more shrinkage than the surrounding putty reinforced with gauging plaster, and thereby cause pits and depressions in the finish coat. Also the putty from hydrated lime which has absorbed carbon dioxide shows an undesirable stiffening or gelling action and does not spread nearly as well as putty made from lime which has been protected from carbon dioxide.

If a specific hydrated lime is used for industrial purposes or as a chemical reagent, the lumps formed by absorption of carbon dioxide become troublesome in feeding equipment and also the carbonates formed reduce the concentration of hydrated lime that is available. This reduction is undesirable in the product.

Carbonation and the associated lumping of hydrated lime caused by absorption of carbon dioxide from the air are typical of the chemical and physical changes that can be avoided by the use of the improved paper herein disclosed as a package material for such sensitive compounds.

As a result of the recognition that carbon dioxide thus adversely affects chemical products such as hydrated lime, various package materials have been developed to overcome the difficulty. Unfortunately, the use of such materials has given rise to other problems and difficulties.

Where large quantities of powdered materials, such as hydrated lime and the like, are bagged, it is often customary in the industry to use a preformed bag into which a conventional spout feeder is inserted and powdered material is introduced from a packing machine. The air entrained in the powdered material causes a back-pressure to develop as the bag is being filled, and unless this entrained air can be switchly vented through pores of the paper, time required to fill a bag will be greatly increased. Production will, therefore, be slowed down and the cost of the packaging operation will rise accordingly.

Forms of paper packaging material known in the art as carbon dioxide barriers have one common failing; they are quite impervious to the flow of air. When a preformed bag manufactured from one of the common carbon dioxide barriers is filled by means of a spout introduced through a valve in the package, the entrained air is not readily vented and the bagging operation is slow and uneconomical.

For example, a conventional 2 ply kraft paper bag can be filled with 50 pounds of hydrated lime from a packer in 12 seconds, while a 3 ply bag of the same size, having as one of its plies an asphalt laminated liner, requires 26 seconds to be filled with 50 pounds of hydrated lime from the identical machine.

The improved paper disclosed herein vents air almost as rapidly as the original paper from which it is made and preformed bags made from the improved paper fill at rates substantially as fast as those of bags made from the original paper.

Therefore, one of the primary objects of this invention is to provide an improved paper for packaging hydrated lime and the like that prevents the ready passage of carbon dioxide therethrough.

Another object of this invention is to provide an improved carbon dioxide barrier paper that may be used to make bags or packages without substantially changing the handling characteristics of the paper or impairing the filling characteristics of the bags or packages made therefrom.

Another object is to provide an improved paper that serves as a carbon dioxide barrier without interfering with the normal passage of air through the pores of the paper.

Another object is to provide a new and improved packaging paper that will prevent carbonation and associated lumping and crusting when said paper is used to package hydrated lime and the like.

Another object of this invention is to provide a new and improved method for manufacturing a container for carbon dioxide sensitive materials.

Further objects and advantages will be seen, and a fuller understanding of the invention may be had from a reading of the more detailed description and the appended claims.

The process used in preparing our improved paper consists in general of applying a coating of a film forming material selected from the class of organic chemicals known as polyvinyl alcohols to paper manufactured in the conventional manner. The coating material is applied in the form of a liquid to the surface of the paper and thereafter allowed to dry.

In a series of laboratory tests, pieces of kraft paper of the type used for making bags were treated with varying amounts of polyvinyl alcohol. The polyvinyl alcohol used was of a commercial grade, and throughout the disclosure where polyvinyl alcohol is referred to, it is meant a partially hydrolyzed commercial grade of polyvinyl alcohol. The papers were coated as follows:

A 2% cold water dispersion of polyvinyl alcohol was prepared and heated at 200° F. with constant stirring until a clear solution was obtained. This solution was painted on the paper and air dried with as many applications being used as necessary to achieve the desired coating by weight. Test groups of these papers were prepared having a coating of 1.4%, 2.0%, 2.4%, 3.0%, 5.0% and 7.9%, respectively, based upon the weight of the uncoated kraft paper.

From these treated pieces of paper and from some of the untreated paper small single ply bags were formed by hand. In each bag was placed 200 g. of a type of hydrated lime known to the trade as "Type S" on which free moisture and ignition loss had been determined, and the bags were sealed shut. The bags were placed in a room maintained at 77° F. and 50% relative humidity. Previous experience had shown that one week's exposure of bagged lime to such conditions was the equivalent to one month's storage in a good warehouse during normal weather conditions.

Each week one of the test bags for each coating weight and an untreated control bag were removed and the contents tested for free moisture and ignition loss. During the ignition loss test the sample is heated to a temperature of 900° C., the free moisture, the water of hydration and the carbon dioxide present in the sample are expelled.

The change in the measured loss on ignition (L.O.I.) is indicative of the carbon dioxide pickup of the sample under test. Thus, if a sample of lime, the original loss on ignition of which was known, is tested and found to have a greater loss on ignition, this is indicative that there has been a pickup of carbon dioxide by the sample, and the amount of carbon dioxide pickup may be approximated by the change in the measured loss on ignition.

The free moisture which is expelled from the sample before the latter reaches the ignition temperature is measured and is indicative of the degree to which moisture has been permitted to permeate the bag.

Table I shows the change in the measured free moisture and ignition loss values of the test samples during exposure at 77° F. and 50% R.H.

*Table I*

| Polyvinyl Alcohol coating by Weight of Paper (1 Ply Bag) | | When bagged | Lime After 1 Week at 77° F., 50% R.H. | Lime After 2 Weeks at 77° F., 50% R.H. | Lime After 3 Weeks at 77° F., 50% R.H. |
|---|---|---|---|---|---|
| | | Percent | Percent | Percent | Percent |
| No coating | F.M.[1] | 0.51 | 0.91 | 1.16 | 1.20 |
| | L.O.I.[2] | 26.2 | 27.6 | 29.0 | 29.1 |
| 1.4% | F.M. | 0.51 | 0.82 | 0.78 | 1.03 |
| | L.O.I | 26.2 | 27.2 | 27.0 | 29.0 |
| 2.0% | F.M | 0.51 | 0.59 | 0.70 | 0.66 |
| | L.O.I. | 26.2 | 26.7 | 26.5 | 26.5 |
| 2.4% | F.M. | 0.51 | 0.54 | 0.75 | 0.69 |
| | L.O.I. | 26.2 | 26.6 | 26.5 | 26.0 |
| 3.0% | F.M. | 0.51 | 0.54 | 0.70 | 0.66 |
| | L.O.I. | 26.2 | 26.5 | 26.4 | 26.4 |
| 5.0% | F.M. | 0.51 | 0.52 | 0.69 | 0.66 |
| | L.O.I. | 26.2 | 26.3 | 27.2 | 26.4 |
| 7.9% | F.M. | 0.51 | 0.51 | 0.66 | 0.60 |
| | L.O.I. | 26.2 | 26.2 | 26.3 | 26.4 |

[1] Free moisture content.
[2] Loss on ignition.

Slight variations in the above results may be attributed to experimental error. It will be noted that after three weeks testing, which is equivalent to three months storage in a warehouse, the lime in the uncoated bag and in the bag having only a 1.4% coating exhibited a marked increase in the loss on ignition, whereas the lime in those bags having a coating of at least 2% by weight exhibited no substantial increase in loss on ignition. Therefore, it is apparent that a coating of polyvinyl alcohol in the amount of about 2% or higher by weight of the paper was effective in materially reducing the amount of carbon dioxide pickup of the bagged lime.

In another test, the outer plies of several conventional 2 ply preformed bags were coated with a solution of commercial grade polyvinyl alcohol, prepared as above, so that one set of bags received a coating of 5% by weight of the bag (i.e., 10% by weight of the paper in the outer ply), and another received a coating of 2.5% by weight of the bag (i.e., 5% by weight of the paper in the outer ply). These coated bags and a number of uncoated bags, were filled with hydrated lime from a conventional packer and stored in a warehouse. Each month during the test a bag from each set was removed, and the free moisture, ignition loss and carbon dioxide content of the lime in each bag were measured. Lumping (crusting) was also noted. Table II shows the results of these tests:

*Table II*

[Lime in untreated bags; time to fill to 50 lbs.—12.9 sec.]

| | Fresh | 1 Mo. | 2 Mos. | 3 Mos. | 4 Mos. |
|---|---|---|---|---|---|
| L.O.I. | 19.74 | 21.07 | 21.25 | 23.92 | 22.85 |
| Free Moisture | 0.12 | 0.79 | 0.80 | 0.98 | 0.90 |
| Carbon Dioxide | 2.4 | 3.0 | 5.9 | 5.1 | 4.9 |

[Lime in bags coated with polyvinyl alcohol (2.5% by weight of bag; 5% by weight of coated ply paper); time to fill to 50 lbs.—14.3 sec.]

| | Fresh | 1 Mo. | 2 Mos. | 3 Mos. | 4 Mos. |
|---|---|---|---|---|---|
| L.O.I. | 19.74 | 20.56 | 20.28 | 20.82 | 21.00 |
| Free Moisture | 0.12 | 0.69 | 0.75 | 0.70 | 0.69 |
| Carbon Dioxide | 2.4 | 2.4 | 2.2 | 2.4 | 2.4 |

[Lime in bags coated with polyvinyl alcohol (5% by weight of bag; 10% by weight of coated ply paper); time to fill to 50 lbs.—16.1 sec.]

| | Fresh | 1 Mo. | 2 Mos. | 3 Mos. | 4 Mos. |
|---|---|---|---|---|---|
| L.O.I. | 19.74 | 20.68 | 20.33 | 21.04 | 21.06 |
| Free Moisture | 0.12 | 0.70 | 0.60 | 0.79 | ------ |
| Carbon Dioxide | 2.4 | 2.3 | 2.7 | 3.0 | 2.1 |

At the end of three months the material within the coated bags showed no lumping or peripheral crusting whereas the material in the untreated bags showed a ⅜ inch peripheral crust, i.e., crusting of the portions of the material closest to the bag surfaces.

It is apparent from the results of these tests, that the coated bags permitted the passage of water vapor, but acted as an effective barrier to carbon dioxide. The filling rates were substantially the same as the untreated bags.

In another series of tests, kraft paper of the type normally used in bags was coated with polyvinyl alcohol in a conventional machine of the type used to apply coatings to paper. Two batches of paper were made, one having a coating of 6.8% based upon the weight of the paper, the other a coating of 2.7% based upon the weight of the paper. These coated papers were then used for one ply of typical two ply lime bags made in a conventional bag making machine. The two sets of bags and similar bags made with untreated paper were filled with hydrated lime from a conventional packer and stored in a warehouse. Examinations were made monthly as above. Table II shows the results of these tests:

*Table III*

[Lime in untreated bags; time to fill to 50 lbs.—10 sec.]

| | Fresh | 1 Mo. | 2 Mos. | 3 Mos. |
|---|---|---|---|---|
| L.O.I. | 25.65 | 26.55 | 27.94 | 29.80 |
| Free Moisture | 0.30 | 0.65 | 0.70 | 0.58 |
| Carbon Dioxide | 1.4 | 2.2 | 6.0 | 8.3 |

[Lime in bags coated with polyvinyl alcohol (1.35% by weight of bag; 2.7% by weight of coated ply paper); filling time to 50 lbs.—12.7 sec.]

| | Fresh | 1 Mo. | 2 Mos. | 3 Mos. |
|---|---|---|---|---|
| L.O.I. | 25.65 | 25.95 | 26.38 | 26.43 |
| Free Moisture | 0.30 | 0.65 | 0.69 | 0.70 |
| Carbon Dioxide | 1.4 | 1.12 | 1.8 | 5.1 |

[Lime in bags coated with polyvinyl alcohol (3.4% by weight of bag; 6.8% by weight of coated ply paper); time to fill to 50 lbs.—20.0 sec.]

| | Fresh | 1 Mo. | 2 Mos. | 3 Mos. |
|---|---|---|---|---|
| L.O.I. | 25.65 | 25.96 | 26.22 | 26.36 |
| Free Moisture | 0.30 | 0.65 | 0.72 | 0.80 |
| Carbon Dioxide | 1.4 | 1.4 | 1.3 | 2.6 |

The material in the untreated bags showed some carbonation lumping at the end of the first month. At the end of two months a peripheral crust ½" to ⅝" thick had formed, and this crust was over ⅝" thick at the end of three months. The material in the bags having a 2.7% polyvinyl alcohol coating showed no lumping at the end of one month, a small amount of lumps up to ¼" in diameter at the end of two months, and a peripheral crust thicker than ¼" at the end of three months. The material in the bags having one ply coated with 6.8% polyvinyl alcohol by weight of the paper in the ply showed no lumping or peripheral crusting after three months. It will be noted that as in the previous example, the coated paper permitted the passage of water vapor but acted as a barrier to carbon dioxide.

It is apparent from the foregoing results that paper having a polyvinyl alcohol coating of at least 2% by weight of the paper will materially retard the passage of carbon dioxide therethrough. Paper having a polyvinyl alcohol coating of about 5% by weight or heavier will effectively prevent passage of deleterious amounts of carbon dioxide therethrough. It is recommended that the coating be between about 5% and about 6.8%. A coating as heavy as 10%, however, can be employed without changing either the handling characteristics of the paper or impairing the filling characteristics of the bags or packages made therefrom. It appears to make little difference which surface of the paper is coated and it does not appear to materially effect the results whether the paper is coated before or after making the bag therewith.

The improved paper vents air and water vapor almost as rapidly as the original paper from which it is made while acting as an effective barrier to carbon dioxide. This unusual and totally unexpected result permits the bags to be filled substantially as fast as bags made from the original paper, but the hydrated lime or other sensitive material is protected by the bag from the adverse effects of carbon dioxide contact.

Although the examples cited have been confined to the use of hydrated lime, it is to be understood that the invention has many applications where improved paper as described may be needed for packaging materials sensitive to the absorption of carbon dioxide.

It will be understood that the foregoing has been given only by way of example and various modifications may be made without departing from the spirit and scope of the invention.

What is claimed is:

1. A packaged lime resistant to caking by atmospheric carbon dioxide comprising a mass of pulverulent lime, a multi-ply paper encasement surrounding said mass of lime, one of the plies of said encasement being coated with polyvinyl alcohol in an amount of from 2 percent to 10 percent by weight of the paper in said coated ply.

2. The packaged lime of claim 1 wherein the polyvinyl alcohol coating is in an amount of from 5 percent to 10 percent by weight of the paper in said coated ply.

3. A packaged lime resistant to caking by atmospheric carbon dioxide comprising a mass of pulverulent lime, a two-ply paper encasement surrounding said mass of lime, one of the plies of said encasement being coated with a polyvinyl alcohol in an amount of from 2 percent to 10 perecnt by weight of the paper in said coated ply.

4. The packaged lime of claim 3 wherein the polyvinyl alcohol coating is in an amount of from 5 percent to 10 percent by weight of the paper in said coated ply.

5. The packaged lime of claim 3 wherein the lime is hydrated lime.

6. In a multi-ply paper package containing a carbon dioxide sensitive material of the class of lime and hydrated lime, the improvement which comprises a coating on one surface of one of said paper plies forming said package of polyvinyl alcohol in an amount of from 2 percent to 10 percent by weight of the paper of said ply.

7. The improvement as in claim 6 wherein the polyvinyl alcohol coating is in an amount of from 5 percent to 10 percent by weight of the paper in said coated ply.

8. A method of reducing the caking of pulverized lime during storage which comprises encasing a mass of pulverulent lime in a multi-ply paper bag, one of said plies being coated with polyvinyl alcohol in an amount of from 2 percent to 10 percent by weight of the paper in said coated ply.

9. The method of claim 8 wherein the polyvinyl alcohol coating is present in an amount of from 5 percent to 10 percent by weight of the paper in said coated ply.

References Cited in the file of this patent

UNITED STATES PATENTS 2,163,228    Jorling ---------------- June 30, 1939
2,584,722    London ---------------- Feb. 5, 1952

UNITED STATES PATENT OFFICE
CERTIFICATE OF CORRECTION

Patent No. 3,029,940                      April 17, 1962

Stig Lagergren

It is hereby certified that error appears in the above numbered patent requiring correction and that the said Letters Patent should read as corrected below.

Column 1, line 69, for "switchly" read -- swiftly --; column 3, Table I, column 6, line 8 thereof, for "26.0" read -- 26.9 --; column 4, line 45, for "Table II" read -- Table III --; same column 4, Table III, column 3, line 8 thereof, for "1.12" read -- 1.2 --.

Signed and sealed this 31st day of July 1962.

(SEAL)
Attest:

ERNEST W. SWIDER
Attesting Officer

DAVID L. LADD
Commissioner of Patents